United States Patent
Muralidhran et al.

(10) Patent No.: US 6,341,351 B1
(45) Date of Patent: Jan. 22, 2002

(54) METHOD FOR COMMUNICATING AND CONTROLLING TRANSACTIONS BETWEEN UNSECURED PARTIES

(75) Inventors: N. Muralidhran, Santa Clara; John Torkelson, San Jose, both of CA (US)

(73) Assignee: BancTec, Inc., Dallas, TX (US)

( * ) Notice: Subject to any disclaimer, the term of this patent is extended or adjusted under 35 U.S.C. 154(b) by 0 days.

(21) Appl. No.: 09/074,181

(22) Filed: May 7, 1998

(51) Int. Cl.[7] .............................................. G06F 13/00
(52) U.S. Cl. ...................................................... 713/201
(58) Field of Search ................................. 713/200, 201, 713/202, 155, 161, 165, 167, 172, 175; 380/3, 4, 20, 25, 30, 228, 229, 232, 241

(56) References Cited

U.S. PATENT DOCUMENTS

| | | | |
|---|---|---|---|
| 5,089,954 A | | 2/1992 | Rago ............................ 395/600 |
| 5,442,706 A | * | 8/1995 | Kung ............................ 380/30 |
| 5,473,692 A | * | 12/1995 | Davis ............................ 380/25 |
| 5,475,753 A | * | 12/1995 | Babara et al. .................. 380/4 |
| 5,757,914 A | * | 5/1998 | McManis ....................... 380/23 |
| 5,812,764 A | * | 9/1998 | Heinz ............................ 713/202 |
| 5,872,848 A | * | 2/1999 | Romney et al. ................ 380/25 |
| 5,887,131 A | * | 3/1999 | Angelo .......................... 713/202 |
| 5,953,420 A | * | 9/1999 | Matyas, Jr. et al. ............ 380/21 |
| 5,982,891 A | * | 11/1999 | Ginter et al. ................... 380/4 |
| 6,073,241 A | * | 6/2000 | Rosenberg et al. ........... 713/201 |

FOREIGN PATENT DOCUMENTS

EP          91107143.9          5/1991          ............. G06F/9/46

* cited by examiner

*Primary Examiner*—James P. Trammell
*Assistant Examiner*—Pierre Eddy Elisca
(74) *Attorney, Agent, or Firm*—Locke Liddell & Sapp LLP

(57) ABSTRACT

A method for communicating transactions on a network of unsecured parties includes a first party generating a request to a second party on a network to initiate a transaction. The second party maintains a data base containing a plurality of separate transactions. The second party in response to the request, generates and communicates to the first party a unique transaction identifier. The first party trades the processing of the transaction in the second party's data base using the transaction identifier to gain access to the second party's data base.

2 Claims, 1 Drawing Sheet

METHOD FOR COMMUNICATING AND CONTROLLING TRANSACTIONS BETWEEN UNSECURED PARTIES

TECHNICAL FIELD OF THE INVENTION

The present invention relates to computer systems, and more particularly to a method to encapsulate and control a unit of work for communication and interaction between unsecured parties on a network.

BACKGROUND OF THE INVENTION

Computer systems traditionally provide authentication at the system level through account identifiers and passwords, and subsequently record or transaction level access is controlled either through access control lists or application software control. Access to the system through accounts and passwords is required before access to the transaction.

The primary limitation of this traditional approach is that for secure access to the record or transaction, each potential participant or user of the transaction must be defined as a valid user on the system. Systems do not allow participation of unregistered users in the process in a secure manner at the transaction level.

The Internet dramatically demonstrates that as a network expands, the network becomes dramatically more valuable to the organization. The value of the network is proportional to the potential pool of participants in the business process. However, participation of unregistered users is limited to basic access to the system. This access may consist of, for example, browsing the web site and downloading public software.

There is no way to distinguish groups of unregistered users other than to again group them with roles and publishing the accounts and passwords for these roles. It is also impossible to register every single potential user on the Internet as the pool of such users would potentially run in the hundreds of millions. Because of this user base extension it is not possible for each and every individual user of the system to operate from a required platform or load proprietary software to run the workflow application or be a registered user on the system. Therefore, a need exists for a new work access method which focuses on the de-segmentation of the market in all inclusionary process in order to expand the potential reach of the work process to potentially include any potential user on the web.

An example of a transaction that requires a transaction between two unregistered parties is an electronic commerce purchase on the Internet. Current approaches require either registration of the user with the seller or alternatively the use of a third party verifier (e.g. SET, DigiCash) to allow the transaction to occur between parties. Systems currently available do not allow users to participate in an external system on a temporary secure basis. An example transaction is the purchase of a book across the Internet. The user may purchase a book through the Internet from an on-line vendor. The financial transaction is through a third party verifier (e.g. SET).

A need has thus arisen for a method for communicating transactions between unsecured parties which provides for the encapsulation of the transaction to allow the transaction to occur between unregistered parties and thereby allowing a user to track and control the transaction in the data base and workflow of the party processing the transaction.

SUMMARY OF THE INVENTION

The present method provides for the capability to identify and create discrete work units that can be communicated between remote users. The discrete unit is referred to as a courier agent. The agent provides all necessary computing infrastructure plus the required work data for a user to execute the work. Work that currently operates in a secure connected synchronous computing environment can be separated as a discrete transaction and processed outside of secure environment boundaries. The discrete transaction, via the courier agent, can also operate in an asynchronous distributed and/or mobile computing environment. Using the present unique identifier, a transaction can be managed throughout the life of the transaction by the workflow or other similar facilities of the central computing environment.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Referring to the FIGURES, the method of the present invention is illustrated in block diagram format. The present method provides for the encapsulation of a transaction including a unique object identifier for all relevant transaction data, the functions required to operate on the data, a state log to manage sessions, and state management. The present method allows communication between unsecured parties on a network. The transactions are initiated by a transaction initiator such as, for example, a buyer initiating a purchase order, an individual applying for a credit card, by filing an application, an individual requesting credit by filing a loan application, or an individual requesting life insurance by completing a life insurance policy application. Each of these network users is referred to as a transaction initiator or the transaction initiating party. The user at which the transaction is targeted is referred to herein as the responding party or transaction processor. The transaction processor is the party responsible for fulfilling the purchase order of the buyer, processing a credit card application such as a credit card issuing company, a bank processing a credit card application or loan application, or a life insurance company processing the life insurance application.

A second, variant mode of transaction initiation is also provided in the current method. In this mode, while the two parties will remain the same for purposes of clarity of explanation, the actual initiation of a particular transaction may occur at the responding party's discretion, with the remainder of the methods and interactions then being materially the same. An example of such usage is transactions initiated by a workflow process in the transaction processor, performing a check processing function, where an image of a questionable check is sent to the account holder to verify validity prior to honoring.

Yet another variant mode of transaction initiation is provided where one transaction may cause one or more additional transactions to occur, each operating then essentially independently between the parties. An example is when the before mentioned purchase order must be split into multiple, separate transactions by the transaction processor, one to continue currently, a second to handle a back ordered, out of stock condition.

The present method allows the transaction initiator to communicate with the transaction processing party in a secured environment while allowing the transaction initiator to track the processing of the transaction within the data base and workflow of the transaction processing party to determine the status of the transaction such as, for example, the status of filing an order or the approval process of a loan application.

Figure 1:
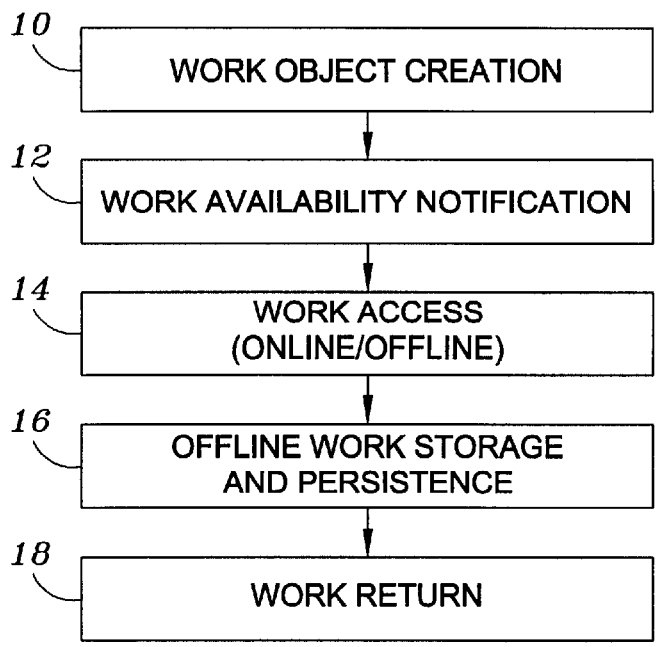
FIGS. 1 and 2 are block diagrams illustrating operation of the present method.

Referring to FIG. 1, the present method consists of five distinct steps, the creation of the work object, step 10; the transportation of the work notification availability, step 12, or the creation of the unique transaction identifier; work access at step 14; off-line work storage at step 16; and work return at step 18. An important aspect of the present method is the work object creation at step 10.

Figure 2:
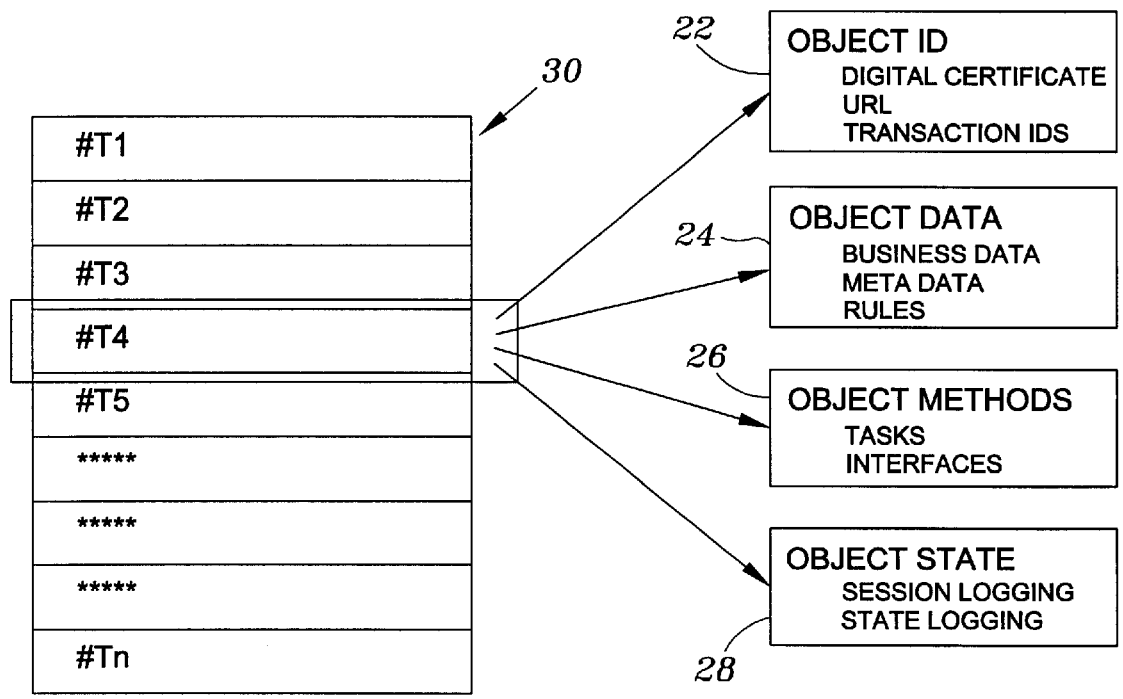

Referring to FIG. 2, step 10 includes the creation of an encapsulated work object including a unique transaction identifier. The encapsulated work object includes the unique object identifier 22, object data 24, object methods 26, and object state 28. All transactions are maintained in the transaction processing party's data base 30. Transactions include T1 . . . Tn. Each transaction realizing the method of the present invention is independent within the transaction processing party's data base 30 and allows the transaction initiator to gain access to this data base for a particular transaction without gaining access to other transactions, T, in the transaction processing party's data base 30. The object identified is used as the work availability notification mechanism to the target or responding party. The object identifier is transmitted from the target party to the transaction initiating party via standard network, such as, for example, e-mail, web-casting through the Channel Definition Format, or through Netcasting. Any distribution mechanism can be utilized with the present invention to transmit a binary or HTML document as the transport medium. In addition, for added security, the transmit medium may provide additional security enhancements through encryption of a binary message.

As illustrated in FIG. 2 the transacting processing party's data base 30 includes a plurality of separate transactions, T. The object identifier 22 contains a unique transaction identifier that uniquely identifies the transaction within the data base 30. The transaction identifier is a primary or compound key to the host system that uniquely identifies the transaction. The object identifier may include a unique string or represent a pointer to a mapping table that maps the transaction identifier to the desired record T. The mapping may include, for example, a one-one mapping or alternatively be many to many, one to many, or many to one relationship. The relationship may include a transaction in the traditional sense or can also be to a record, for example, a customer profile, issues list, etc.

In addition, the object identifier 22 contains a location identifier based on URL that uniquely identify the location of the object and provides access to the object and data base 30. The URL is chosen as the location indicator as is presently used with traditional methods of access to a data base.

The final component of object identified 22 is digital certification that provides the transaction initiator a secure capability to access the object within data base 30. The digital certificate is supported through a one-way algorithm that uniquely identifies the access requested to the host system. Each object identifier includes a unique certificate and a private key mechanism where encryption is used. The three components of the object identifier 22 provide the location identifier to locate the system (URL), and identifier that identifies the specific transaction or record, and a digital certificate to provide authorization to that specific transaction.

The transaction initiator can utilize the object identification 22 to access the remaining elements of the work object including the object data 24, object method 26 and object state 28.

The present method supports two modes of operation, asynchronous-on-line and asynchronous-off-line. The asynchronous in both modes refer to the method of communication of the notification. Using SMTP through e-mail and HTTP through Webcasting and Netcasting, the communication of the notification is asynchronous. The present method utilizes this asynchronous communication to external unregistered users since synchronous communications generally implies user authentication at a system level.

Step 14 (FIG. 1) refers to the on-line and off-line access method after the notification of the object identification is received. In the on-line mode, the notification is used to locate the system and secure access to the specific transaction, T in data base 30. Work is done by remaining connected to the system. Disconnecting the line, terminates the work and to continue, the user needs to utilize the object identifier to access the system again. The off-line mode refers to the capability to work on the data obtained from data base 30 off-line. Off-line operation is achieved by connecting to the system on-line and then off-loading the other components of the transaction (object data, object methods, and object state) from the server and stored on a local repository on the transaction initiating party's system. Disconnect operations require the courier agent be e-mailed while connected usage requires only the URL being mailed to the target party.

Work is accessed by the using party utilizing an e-mail package or browser and guided through the tasks as determined by the encapsulated work flow. The courier agent provides all transaction work date, the tools and meta-data about the work item needed by the user for further processing. In the event, on-line access to the original system's resources are required, the courier agent secures access using the UID as the access code.

The courier agent provides a mechanism to download all required transaction data and methods onto a local mobile platform to allow off-line processing.

At step 16, the object model defined for the transaction provides the mechanism to create persistence of the object. The object model extends the traditional object model by providing two additional entities, object state and object ID.

Step 18 is required for the return of work that has been downloaded to the user system. In the upload, the object identifier is used again as defined earlier to access the system of the transaction processing party. Both objects on the transaction initiating party and server are synchronized. The server replica copy of the object is used to update the server with the appropriate transaction date. The object of the transaction initiating party is then deleted.

It therefore can be seen that the present method provides for secure transaction based or record based access to systems from unregistered users, whether the transaction initiated by the unregistered user or by the system. Transactions are uniquely identified and created using a unique identifier for management of the transaction through the life of the transaction.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A method for communicating transactions on a network of unsecured parties, comprising:

a first party on the network generating a request to a second party on the network to initiate a transaction, the second party maintaining a data base containing a plurality of separate transactions;

the second party in response to the request, automatically generating and communicating on the network to the first party a unique transaction identifier for the first party's transaction; and the first party tracking processing of the transaction in the second party's data base using the unique transaction identifier to gain access to the second party's data base without gaining access to other transactions in the second party's data base to thereby allow the first party to track processing of the transaction and determine a status of the transaction while allowing the second party to continue to communicate with additional parties.

2. The method of claim 1 and further including:

extending a workflow process relating to a particular transaction within the second party's data base of transactions to generate and communicate the transaction to the first party including transactional data and methods for processing;

tracking of the transaction uniquely within a plurality of such transactions in the second party's data base using the unique transaction identifier; and subsequently the first party's return of such transaction to concisely rejoin the workflow process within the second party's data base without gaining access to other transactions or workflow entities in the second party's data base.

* * * * *

UNITED STATES PATENT AND TRADEMARK OFFICE
CERTIFICATE OF CORRECTION

PATENT NO. : 6,341,351
DATED : January 22, 2002
INVENTOR(S) : N. Muralidhran

Page 1 of 1

It is certified that error appears in the above-identified patent and that said Letters Patent is hereby corrected as shown below:

<u>Title page,</u>
Item [57], ABSTRACT, replace "trades" with -- tracks --.

Signed and Sealed this

Twenty-first Day of May, 2002

Attest:

Attesting Officer

JAMES E. ROGAN
*Director of the United States Patent and Trademark Office*